July 20, 1948.　　　　F. B. JOHNSON　　　　2,445,399
AIRPLANE HINGE CONNECTION
Filed June 14, 1945　　　　　　　　　　　　　　2 Sheets-Sheet 1

Inventor
Francis B. Johnson
By　Fred Gerlach　atty.

July 20, 1948.  F. B. JOHNSON  2,445,399
AIRPLANE HINGE CONNECTION
Filed June 14, 1945  2 Sheets-Sheet 2
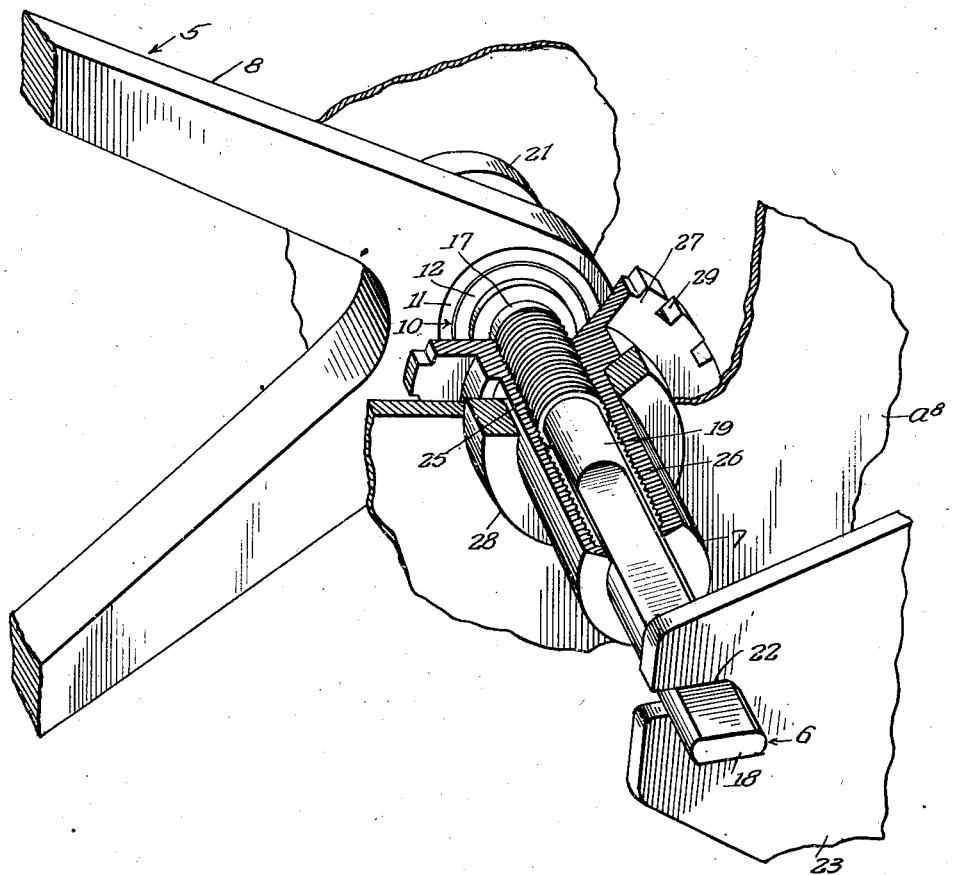
Inventor:
Francis B. Johnson
By Thed Gerlach Atty.

Patented July 20, 1948

2,445,399

UNITED STATES PATENT OFFICE 2,445,399

AIRPLANE HINGE CONNECTION

Francis B. Johnson, Wayne, Mich., assignor to Consolidated Vultee Aircraft Corporation, San Diego, Calif., a corporation of Delaware Application June 14, 1945, Serial No. 599,485

6 Claims. (Cl. 244—90)

The present invention relates generally to hinge connections for use in airplanes. More particularly the invention relates to that type of hinge connection which serves pivotally to connect an airplane control surface, such, for example, as an aileron, elevator, flap or tab to the fixed supporting surface with which the control surface is associated and as its principal components comprises: (1) a bracket which is fixedly connected to, and extends rearwards from, the trailing portion of the fixed supporting surface and projects into a transverse slot in the leading edge of the control surface; and (2) a pin variety pivot element which is carried by the control surface and extends through an aperture in the rear end of the bracket.

One object of the invention is to provide a hinge connection of this type which is an improvement upon, and has certain inherent advantages over, previously devised hinge connections and is characterized by the fact that its design and construction are such that it is possible to make the slot into which the bracket projects extremely narrow and thus improve the aerodynamic qualities of the control surface.

Another object of the invention is to provide an airplane hinge connection of the type and character under consideration in which the arrangement and design of the parts are such that the connection as a whole may be assembled and dismantled with facility and without the necessity of providing a door or panel closed access opening in the control surface.

Another object of the invention is to provide an airplane hinge connection of the aforementioned type in which the pin variety pivot element is mounted so that it is shiftable axially into and out of its operative position wherein it extends through the aperture in the rear end of the bracket and has associated with it a rotatable sleeve-like member which surrounds a portion of the element and is connected to the element by a screw thread connection in order that when it is turned in one direction it shifts the element axially in one direction and when it is reversely rotated it shifts the element axially in the opposite direction.

A further object of the invention is to provide an airplane hinge connection of the last mentioned character in which the rotatable sleeve-like member is provided with a part which is disposed within the slot in the leading edge of the control surface and is capable of being gripped by a wrench or other turning tool in connection with turning of the member to effect axial shift of the pin variety pivot element.

A still further object of the invention is to provide an airplane hinge connection which is generally of new and improved construction, effectively and efficiently fulfills its intended purpose and is characterized by the fact that it is light in weight and may be produced at a comparatively low cost.

Other objects of the invention and the various advantages and characteristics of the present airplane hinge connection will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 3 is an enlarged fragmentary perspective of the connection.

Figure 1:
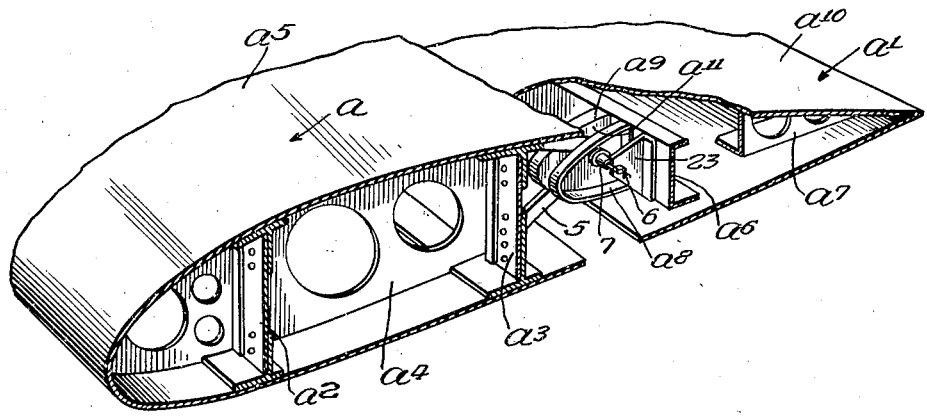
Figure 1 is a fragmentary perspective of an airplane wing and aileron having applied thereto a hinge connection embodying the invention.

The hinge connection which is shown in the drawings constitutes the preferred form or embodiment of the invention. It is illustrated in connection with an airplane wing $a$ and an aileron $a^1$ and serves so as to connect the aileron to the wing that it is capable of swinging or tilting upwards and downwards relatively thereto. The wing $a$ is of standard or conventional design and comprises a front longitudinaly extending spar $a^2$, a rear longitudinally extending spar $a^3$, a series of laterally spaced cross-ribs $a^4$, and a skin $a^5$ around the spars and cross-ribs. It constitutes one of the fixed supporting surfaces of the airplane and is disposed forwards of the aileron $a^1$. The latter functions as one of the controlling surfaces of the airplane, as well understood in the art, and embodies a longitudinally extending spar $a^6$, a series of laterally spaced tail ribs $a^7$, a pair of nose ribs $a^8$ and $a^9$, and a skin $a^{10}$ around the spar and ribs. The tail ribs $a^7$ are connected to, and project rearwards from the spar $a^6$ and taper rearwards. The nose ribs $a^8$ and $a^9$ are connected to, and project forwards from the spar $a^6$ and, as shown in the drawings, are spaced but a small distance apart so as to define between them a slot $a^{11}$. The leading or front portion of the skin $a^{10}$ of the aileron $a^1$ is C-shaped in cross section and has a cutout $a^{12}$ therein in order to expose the slot $a^{11}$ between the two nose ribs $a^8$ and $a^9$. As its principal components the hinge connection comprises a bracket 5, a pin variety pivot element 6, and a sleeve-like member 7.

The bracket 5 constituting one of the components of the hinge connection is connected to, and projects rearwards from the rear spar $a^3$ of the wing $a$ and has the rear end thereof disposed in the slot $a^{11}$ between the nose ribs $a^8$ and $a^9$ of the aileron $a^1$. It is preferably in the form of a one-piece aluminum casting and consists of a pair of forwardly divergent legs 8. The front ends of the legs are provided with integral angularly disposed feet 9 and these fit flatly against, and are riveted or otherwise fixedly secured to, the rear spar $a^3$ of the wing. The rear ends of the legs 8 are joined together and carry a ball bearing 10. The latter consists of an outer race 11, an inner race 12 and an annular series of balls 13 between the two races. The outer race 11 fits within a circular hole 14 in the part of the bracket 5 that constitutes the juncture point of the rear ends of the legs 8. Preferably the outer race 11 of the ball bearing 10 is secured in place by a drive or press fit in order that it is normally retained against axial displacement with respect to the bracket. The inner race 12 is rotatable with respect to the outer race and has a centrally disposed cylindrical aperture 15 therethrough. The bearing 12 is arranged so that its axis is substantially parallel to the spar $a^6$ of the aileron $a^1$.

Figure 2:
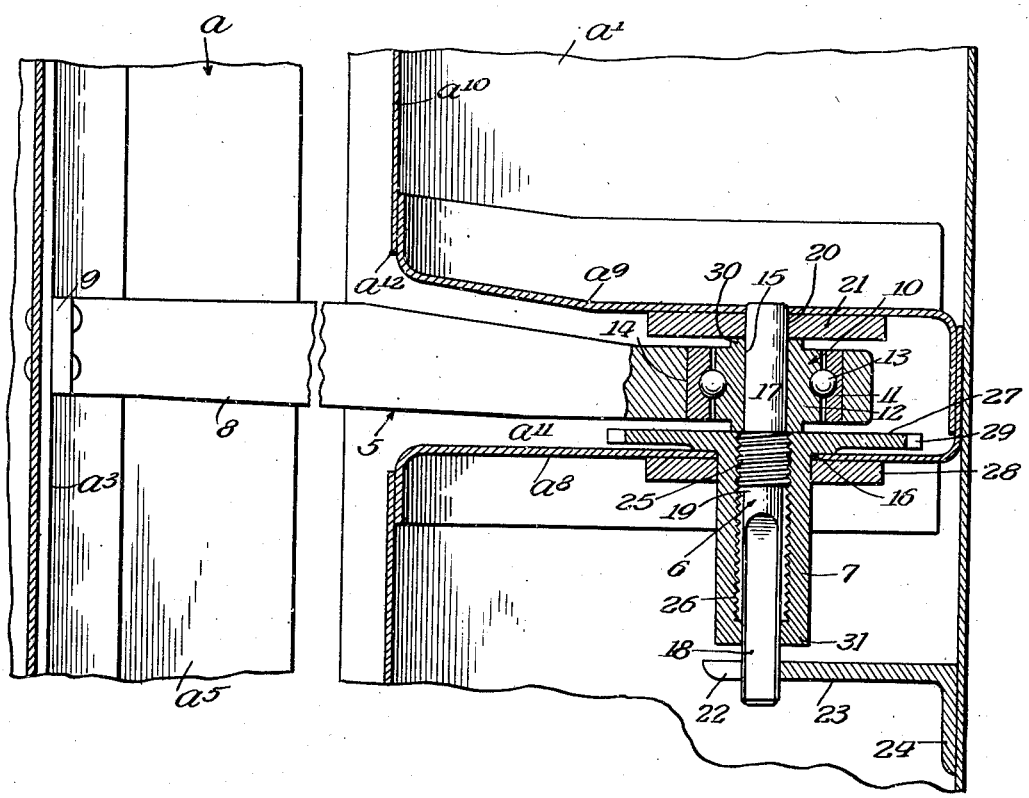
Figure 2 is an enlarged horizontal section of the hinge connection illustrating in detail the construction and arrangement of the various component parts of the connection.

The pin variety pivot element extends through an over-sized circular hole 16 in the rear portion of the nose rib $a^8$ and is disposed in parallel relation with the aileron spar $a^6$. It constitutes the fulcrum or articulation point of the hinge connection and embodies a cylindrical end 17, an end 18 of polygonal cross section, and an enlarged intermediate part 19. The cylindrical end 17 of the element 6 is shaped to fit within, and extend through the cylindrical aperture 15 in the inner race 12 of the ball bearing 10. As hereafter described more in detail, the pin variety pivot element 6 is mounted so that it is shiftable axially into and out of its operative position wherein the cylindrical end 17 is disposed within and extends through the aforementioned aperture 15. When the element is in its operative position, as shown in Figure 2, the outer extremity of its cylindrical end is disposed within a circular hole 20 in the central portion of a disc-like bearing plate 21. Such plate is welded or otherwise fixedly secured to the exposed face of the nose rib $a^9$ and is arranged so that its hole 20 is in concentric relation with the circular hole 16 in the nose rib $a^8$. The diameter of the hole 20 is the same as the diameter of the cylindrical aperture 15 in the inner race of the ball bearing and is but slightly greater than the diameter of the cylinder end 17 of the element 6. The polygonal end 18 of the pin variety pivot element 6 is disposed interiorly of the aileron and fits slidably within a notch 22 in a bracket plate 23. The latter is disposed in parallel relation with the nose rib $a^8$ and has at its rear portion a right angle flange 24 which fits against and is suitably fixedly secured to the spar $a^6$ of the aileron $a^1$. The notched portion of the bracket plate 23 coacts with the polygonal end 18 of the element 6 to prevent rotation of the element while at the same time permitting axial shift of the element. The intermediate part 19 of the element 6 is provided with a male screw thread 25.

The sleeve-like member 7 has a twofold purpose in that it serves as a mount for the pin variety pivot element 6 and also as means for shifting the element axially into and out of its operative position. It surrounds the intermediate part 19 of the element and is rotatably mounted as hereinafter described. The inner periphery of the member 7 is provided with a female screw thread 26 which is in interfitting relation with the male screw thread 25. When the member 7 is turned in one direction the screw threads 25 and 26 coact to slide the element 6 axially into its operative position wherein, as previously pointed out, the cylindrical end 17 of the element fits in and extends through the aperture 15 in the inner race of the ball bearing 10. When the member 7 is reversely rotated the screw threads 25 and 26 coact to shift the element 6 axially in the opposite direction into an inoperative position wherein the cylindrical end 17 of the element is disposed outside of the aperture 15 and hence is in disconnected relation with respect to the bracket 5. The sleeve-like member 7 is disposed for the most part between the nose rib $a^8$ and the bracket plate 23. The end of the member 7 that is nearer the bearing 10 extends through the hole 16 in the nose rib $a^8$, embodies an annular outwardly extending flange 27, and is journalled in a ring shaped bearing plate 28. The plate 28 is welded or otherwise fixedly secured to the inner or unexposed face of the nose rib $a^8$ and is arranged so that its central hole or aperture is in concentric relation with the circular hole 16. The annular flange 27 is located in the slot $a^{11}$ between the bearing plate 21 and the nose rib $a^8$ and embodies in its outer periphery a series of spaced apart notches 29 whereby it may be gripped by a spanner wrench or like tool in connection with turning of the member 7. The flange 27 and the bearing plate 21 bear against annular shoulders 30 on the ends of the inner race 12 of the ball bearing 10 and coact with said shoulders to prevent lateral displacement of the aileron with respect to the bracket 5. The end of the member 7 that is farther from the ball bearing 10 is provided with an annular inwardly extending flange 31 which coacts with the enlarged intermediate part 19 of the element 6 to limit retraction of the element, i. e., axial shift of the element into its inoperative position.

When it is desired to mount the aileron $a^1$ with respect to the wing $a$ the sleeve-like member 7 is rotated so as to effect full retraction of the pin variety pivot element 6. Thereafter the aileron is manipulated into a position wherein the rear end of the bracket 5 is disposed within the slot $a^{11}$ and the cylindrical end 17 of the element 6 is in axial alignment with the cylindrical aperture 15 in the inner race of the ball bearing 10. As soon as the aileron is so positioned the member 7 is reversely rotated so as to effect axial feed of the element 6 into its operative position wherein, as previously pointed out, its cylindrical end 17 extends through the aperture 15 and into the central hole in the bearing plate 21. As soon as the element 6 is in its operative position the aileron $a^1$ is connected to the wing $a$ in such manner that it is free to tilt or swing upwards and downwards. It is contemplated that the sleeve-like member 7 will be turned by inserting a spanner wrench or other tool into the slot $a^{11}$ and applying it to the notched outer peripheral portion of the flange 27. In connection with turning of the member 7 the notched portion of the bracket plate 23 coacts with the polygonal end 18 of the element 6 to prevent turning of the element while at the same time permitting the element to move axially. Any suitable releasable means (not shown) may be provided to lock the member 7 against undesired rotation.

The herein described hinge connection, due to the design, arrangement and construction of its various component parts, makes it possible to make the slot $a^{11}$ into which the bracket 5 projects extremely narrow and thus improve the aerodynamic qualities of the control surface. By having the slot $a^{11}$ extremely narrow air flow "burble" or turbulence over the aileron $a^1$ is reduced to a minimum. The arrangement, design and construction of the component parts of the hinge connection are also such that the connection as a whole may be assembled and dismantled with facility and without the necessity of providing a door or panel closed access opening in the aileron. The subject hinge connection effectively and efficiently fulfills its intended purpose and not only is light in weight but also may be produced at a comparatively low cost.

Whereas the hinge connection has been described and illustrated in connection with an airplane wing and aileron it is to be understood that it may also be used pivotally to connect any other control surface, such, for example, as an elevator, flap or tab to its associated fixed supporting surface. It is also to be understood that the invention is not to be restricted to the details set forth since these may be modified within the scope of the appended claims without departing from the spirit and scope of the invention.

Having thus described the invention, what I claim as new and desire to secure by Letters Patent is:

1. In combination with an airplane having a primary surface and a hollow skin covered control surface positioned adjacent the primary surface and provided with a transverse slot opposite said primary surface, a readily detachable hinge connection adapted pivotally to connect the control surface to the primary surface and comprising a bracket connected to the primary surface and having a part projecting into the slot and provided with a transverse aperture therein, a pin mounted within the control surface so that it is shiftable axially back and forth between an operative position wherein one end thereof extends transversely across the slot and into said aperture and an inoperative position wherein it is disposed substantially entirely within the control surface, and mechanical shifting means for the pin mounted within said control surface and arranged so that it is accessible for manipulation purposes via the slot.

2. In combination with an airplane having a primary surface and a hollow skin covered control surface positioned adjacent the primary surface and provided with a transverse slot opposite said primary surface, a readily detachable hinge connection adapted pivotally to connect the control surface to the primary surface and comprising a bracket connected to the primary surface and having a part projecting into the slot and provided with a transverse aperture therein, a pin mounted within the control surface so that it is shiftable axially back and forth between an operative position wherein one end thereof extends transversely across the slot and into said aperture and an inoperative position wherein it is disposed substantially wholly within the control surface, means within the control surface for preventing turning of the pin while at the same time permitting the latter to be shifted axially, and a sleeve-like member extending around the pin, mounted within said control surface so that it is rotatable without axial displacement, and operatively connected to the pin so that when it is turned in one direction it shifts the pin into its operative position and when it is turned in the opposite direction it shifts said pin into its said inoperative position.

3. In combination with an airplane having a primary surface and a hollow skin covered control surface positioned adjacent the primary surface and provided with a transverse slot opposite said primary surface, a readily detachable hinge connection adapted pivotally to connect the control surface to the primary surface and comprising a bracket connected to the primary surface and having a part projecting into the slot and provided with a transverse aperture therein, a pin mounted within the control surface so that it is shiftable axially back and forth between an operative position wherein one end thereof extends transversely across the slot and into said aperture and an inoperative position wherein it is disposed substantially wholly within the control surface, means within the control surface for preventing turning of the pin while at the same time permitting the latter to be shifted axially, and a sleeve-like member extending around the pin, mounted within said control surface rotatable without axial displacement, operatively connected to the pin so that when it is turned in one direction it shifts the pin into its operative position and when it is turned in the opposite direction it shifts said pin into its said inoperative position, and provided with a part within the slot whereby it may be turned by a tool inserted into said slot.

4. In combination with an airplane having a primary surface and a hollow skin covered control surface positioned adjacent the primary surface and provided with a transverse slot opposite said primary surface, a readily detachable hinge connection adapted pivotally to connect the control surface to the primary surface and comprising a bracket connected to the primary surface and having a part projecting into the slot and provided with a transverse aperture therein, a pin mounted within the control surface so that it is shiftable axially back and forth between an operative position wherein one end thereof extends transversely across the slot and into said aperture and an inoperative position wherein it is disposed substantially entirely within the control surface, means within the control surface for preventing turning of the pin while at the same time permitting the latter to be shifted axially, and a sleeve-like member extending around the pin, mounted within said control surface so that it is rotatable without axial displacement, connected to the pin by a screw thread connection so that when it is turned in one direction it shifts the pin into its operative position and when it is turned in the opposite direction it shifts said pin into its said inoperative position, and provided within the slot with an outwardly projecting noncircular flange whereby it may be turned by a tool inserted into the slot.

5. In combination with an airplane having a primary surface and a hollow skin covered control surface positioned adjacent the primary surface and provided with a transverse slot opposite said primary surface, a readily detachable hinge connection adapted pivotally to connect the control surface to the primary surface and comprising a one-piece bracket connected fixedly to the primary surface and having a part extending into the slot and provided with a transverse aperture therein, a pin associated with the control surface, shiftable axially back and forth between an operative position wherein one end thereof extends across the slot and into said aperture and an inoperative position wherein it is disposed substantially wholly within the control surface, and having the other end thereof of polygonal cross section, a bracket plate mounted fixedly within the control surface and having a part arranged in sliding engagement with said other end of the pin and to coact with said other end of the pin to prevent turning of the pin while at the same time permitting the latter to slide axially, and a sleeve-like member extending around the pin, mounted within said control surface to rotate without axial displacement, operatively connected to the pin so that when it is turned in one direction it shifts the pin into its operative position and when it is turned in the opposite direction it shifts said pin into its said inoperative position, and provided within the slot with an outwardly projecting noncircular flange whereby it may be turned by a tool inserted into the slot.

6. In combination with an airplane having a primary surface and a hollow skin covered control surface positioned behind the primary surface and provided with a transverse slot in its leading edge and a hole equipped nose rib in one side of the slot, and a readily detachable hinge connection adapted pivotally to connect the control surface to the primary surface and comprising a bracket connected to, and extending rearwards from, the trailing portion of the primary surface and having the rear end thereof projecting into the slot and provided with a transverse aperture therein in registry with the hole in the nose rib, a pin extending through the hole in the nose rib, shiftable axially back and forth between an operative position wherein one end thereof extends across the slot and into said aperture and an inoperative position wherein it is disposed substantially wholly within the control surface, means within the control surface and adjacent the nose rib for preventing turning of the pin while at the same time permitting the latter to be shifted axially, and a sleeve-like member extending around the pin and through said hole, mounted for rotation about the axis thereof, connected to the pin by a screw thread connection so that when it is turned in one direction it shifts the pin into its operative position and when it is turned in the opposite direction it shifts the said pin into its inoperative position, and provided within the slot with an outwardly extending flange whereby it may be turned by a tool inserted into the slot.

FRANCIS B. JOHNSON.

REFERENCES CITED

The following references are of record in the file of this patent:

UNITED STATES PATENTS

| Number | Name | Date |
|---|---|---|
| 1,793,056 | Carns | Feb. 17, 1931 |
| 1,859,306 | Loening | May 24, 1932 |
| 1,973,268 | Ragsdale | Sept. 11, 1934 |
| 2,206,755 | Schweller | July 2, 1940 |
| 2,315,483 | Salisbury et al. | Mar. 30, 1943 |

FOREIGN PATENTS

| Number | Country | Date |
|---|---|---|
| 138,969 | Belgium | Jan. 5, 1902 |
| 661,258 | Germany | June 18, 1938 |